(12) United States Patent
Herntier et al.

(10) Patent No.: US 9,859,593 B2
(45) Date of Patent: Jan. 2, 2018

(54) VEHICLE COMPONENT

(71) Applicant: Dr. Ing. h.c. F. Porsche Aktiengesellschaft, Stuttgart (DE)

(72) Inventors: Matthias Herntier, Friolzheim (DE); Harald Raiser, Balingen (DE); Hannes Hopp, Waiblingen (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/169,805

(22) Filed: Jun. 1, 2016

(65) Prior Publication Data

US 2016/0351980 A1    Dec. 1, 2016

(30) Foreign Application Priority Data

Jun. 1, 2015  (DE) ........................ 10 2015 108 611

(51) Int. Cl.
| | |
|---|---|
| *H01M 10/613* | (2014.01) |
| *H01M 10/6566* | (2014.01) |
| *B60L 11/18* | (2006.01) |
| *H01M 10/625* | (2014.01) |
| *H01M 2/10* | (2006.01) |
| *H01M 10/6556* | (2014.01) |
| *H01M 10/6568* | (2014.01) |

(52) U.S. Cl.
CPC ..... *H01M 10/6566* (2015.04); *B60L 11/1874* (2013.01); *H01M 2/1077* (2013.01); *H01M 2/1083* (2013.01); *H01M 10/613* (2015.04); *H01M 10/625* (2015.04); *H01M 10/6556* (2015.04); *H01M 10/6568* (2015.04); *H01M 2220/20* (2013.01)

(58) Field of Classification Search
CPC ......................... H01M 10/613; H01M 10/625
See application file for complete search history.

(56) References Cited

U.S. PATENT DOCUMENTS

| | | | |
|---|---|---|---|
| 2004/0069620 A1 | 4/2004 | Bitsche et al. | |
| 2008/0196957 A1* | 8/2008 | Koike | B60K 1/04 180/68.5 |
| 2010/0147488 A1 | 6/2010 | Pierre et al. | |

(Continued)

FOREIGN PATENT DOCUMENTS

| | | |
|---|---|---|
| DE | 100 34 134 | 1/2002 |
| DE | 10 2007 044 461 | 3/2009 |

(Continued)

OTHER PUBLICATIONS

German Search Report dated Jan. 7, 2016.

*Primary Examiner* — Olatunji Godo
(74) *Attorney, Agent, or Firm* — Gerald E. Hespos; Michael J. Porco; Matthew T. Hespos

(57) ABSTRACT

A vehicle component (1) is provided for cooling a traction battery (101) that has at least one battery module (102) with at least one battery cell (103). The vehicle component (1) has a cooling device (2) with a duct system (3) through which a cooling medium can flow. The duct system (3) runs along the battery module (102) for absorbing heat. The battery module (102) has a first cooling duct (13) and a second cooling duct (23). The cooling device (2) is suitable and designed for charging the first and second cooling ducts (13, 23) with the coolant in parallel.

5 Claims, 2 Drawing Sheets

(56) References Cited

U.S. PATENT DOCUMENTS

| | | |
|---|---|---|
| 2010/0261046 A1 | 10/2010 | German et al. |
| 2010/0285347 A1 | 11/2010 | Saito et al. |
| 2011/0139526 A1* | 6/2011 | Lucas ................. B60K 1/04 180/68.1 |
| 2011/0183179 A1 | 7/2011 | Okada |
| 2011/0206948 A1 | 8/2011 | Asai et al. |
| 2014/0014420 A1 | 1/2014 | Nakamura et al. |

FOREIGN PATENT DOCUMENTS

| | | |
|---|---|---|
| DE | 10 2009 029 629 | 6/2010 |
| DE | 10 2010 002 705 | 9/2011 |

* cited by examiner

VEHICLE COMPONENT

CROSS REFERENCE TO RELATED APPLICATION

This application claims priority under 35 USC 119 to German Patent Appl. No. 10 2015 108 611.5 filed on Jun. 1, 2015, the entire disclosure of which is incorporated herein by reference.

BACKGROUND

1. Field of the Invention

The invention relates to a vehicle component for cooling a traction battery of an at least partially electrically operated vehicle, and to a method for operating such a vehicle component.

2. Description of the Related Art

The prior art includes various vehicle components for cooling batteries of electric vehicles. For example, US 2011/0206948 discloses a battery for an electric vehicle having multiple battery blocks. Each battery block has a multiplicity of lined-up cells and a cooling plate through which a coolant flows. The cells of the block are arranged one behind the other on the cooling plate. The coolant is supplied at one side of the block, flows along a U-shaped loop and is discharged at the same side of the block. A problem of such cooling is however that the cooling action decreases with increasing number of cells that are passed through, giving rise to non-uniform cooling.

US 2014/0014420 A1 discloses a battery for an electric vehicle with plate-shaped separators between the cells. Each separator has multiple ventilation ducts. An air flow is generated for cooling the battery and is blown by a fan to the ventilation ducts of the separators via a duct that runs between the individual blocks.

US 2010/0285347 and US 2011/0183179 disclose batteries for electric vehicles. The batteries have battery blocks that are cooled by an air flow. The air flow is blown to the individual cells via a duct that run on the outer sides of opposite blocks. The cooling air then flows to a central air discharge duct via multiple ventilation ducts arranged between the cells. To ensure adequate cooling of those cells farther to the rear of the duct, a variation of the flow cross section of the duct is proposed so that adequate cooling air can flow to the rear cells.

By contrast, it is the object of the invention to provide improved cooling of a traction battery for an at least partially electrically operated vehicle.

SUMMARY

The vehicle component according to the invention is provided for an at least partially electrically operated vehicle such as an electric vehicle or a hybrid vehicle. The vehicle component functions to cool a traction battery with at least one battery module that has at least one battery cell. The vehicle component comprises at least one cooling device with at least one duct system through which at least one cooling medium can flow. The duct system runs at least in sections along the battery module so that heat released by the battery module can be absorbed by the cooling medium. The cooling device comprises at least one first cooling duct and at least one second cooling duct. The first and the second cooling duct are assigned to at least one battery module. The cooling device is suitable and designed for charging the first cooling duct and the second cooling duct with the coolant substantially in parallel.

The vehicle component of the invention has numerous advantages. In particular, uniform cooling of the battery module is achieved by charging the cooling ducts in parallel. By contrast, a battery module cooled by a single cooling duct has the coolant progressively warm the further it flows along the battery module. This problem arises even if the battery module has plural cooling ducts charged with coolant in series. The problem applies for example if the cooling ducts are arranged in the form of a series circuit and are connected to one another, for example, by way of a loop. In these cooling arrangements, too, the coolant in the cooling ducts is progressively warmed up the longer it flows along the battery module. This gives rise to non-uniform and thus disadvantageous cooling for different regions of the battery module. For example, the rear battery cells are at a higher temperature during operation than battery cells of the battery module that are closer to the front.

By contrast, the parallel operation of the cooling ducts according to the invention permits improved and considerably more uniform cooling of the battery module because, for example, the cooling medium in the second cooling duct cools the battery module regardless of whether or not the cooling medium in the first cooling duct already has warmed up during its passage along the battery module.

In the context of the invention, the expression "charging in parallel" means a hydraulic parallel connection. In particular, the first cooling duct is connected in parallel with respect to the second cooling duct. Thus, two coolant circuits are provided and can be operated in parallel. It is preferable for a uniform cooling medium to be provided for both cooling ducts. However it is also possible for different cooling media to be provided for the cooling ducts. The cooling medium is a fluid, and preferably a liquid. A gaseous coolant may also be provided.

The first cooling duct and the second cooling duct may be designed to be charged with coolant independently of one another. The first and the second cooling duct may be flowed through with direction dependency on one another. It is possible that, at certain times, only one duct is flowed through. It may be provided that the first and the second cooling duct are flowed through alternately.

An insulation may be provided at least in sections between the first cooling duct and the second cooling duct so that a heat transfer between the two ducts can be counteracted. This is advantageous if the coolant flows in opposite directions in the two ducts, such that heat transfer in accordance with the countercurrent principle would be possible.

At least one heat-conducting means may be provided at least in sections between the cooling duct and the battery module. The heat-conducting means may be suitable and designed for improving the heat transfer between battery module and cooling duct or coolant. For example, a material of high thermal conductivity may be provided, or a heat-conducting foil or the like may be applied.

The battery module may have two, three or more first and/or second cooling ducts. An even number of first and second cooling ducts may be provided per battery module. Particularly uniform cooling of the battery modules that are passed through is achieved in this way. The cooling ducts may run between two opposite sides of the battery module. In particular, at least one outlet and at least one inlet for the first duct and at least one outlet and at least one inlet for the second cooling duct are provided.

The battery module may comprise two, three or more battery cells. The traction battery comprises at least two, three or a multiplicity of battery modules. A multi-layered arrangement may be provided in which the battery modules are situated one above the other. In this case, multiple layers of cooling ducts are provided. It is also possible for multiple layers of cooling plates to be arranged between the battery modules.

The cooling device is suitable and designed for charging the first and the second cooling duct with the coolant in opposite flow directions. This yields even more uniform cooling of the battery module, because progressive warming of the coolant in one duct is compensated by relatively cool coolant in the other duct. In particular, the first and the second cooling duct are in this case arranged adjacent to one another. The first and second cooling ducts may run substantially parallel to one another. A substantially parallel arrangement may, for example, deviate by an angle of one degree or more, or else by 10 degrees or 15 degrees or more. A parallel arrangement is also possible.

The cooling device may comprise at least one pump. The pump is suitable and designed for conveying the coolant in the cooling ducts. It is also possible for the cooling ducts to be charged with the coolant in passive fashion, for example by convection.

A common pump may be provided for the first and the second cooling duct. The duct system may be designed so that a uniform delivery direction of the pump is divided into two opposite flows of the coolant at least along the battery module. The coolant may also have a uniform flow direction in both ducts.

The first and second cooling ducts may be assigned to at least one battery module group. The module group may comprise at least two battery modules. By way of the parallel connection of the cooling ducts, improved and uniform cooling is achieved even in the case of battery modules arranged one behind the other. The module group may comprise three or more battery modules. The module group may comprise at least two battery modules arranged next to one another.

The first and second cooling ducts may run substantially straight along the battery modules of the module group. The ducts may also have a curvy profile or may be arranged in a loop. The cooling ducts that are assigned to a module group preferably have a common inlet and/or a common outlet. However, separate inlets and/or outlets may be provided. In the case of a traction battery with at least two module groups and preferably with multiple module groups, one first cooling duct and one second cooling duct may be provided for each module group.

The cooling device may be suitable and designed for cooling a traction battery with a multiplicity of battery modules. In particular, it is possible for multiple module groups to be cooled. The cooling device may comprise a multiplicity of mutually adjacent first and second cooling ducts arranged in alternating fashion. For example, the second cooling duct of a first battery module may be to a first cooling duct of a second battery module. Also possible is an arrangement in which a second cooling duct of one battery module is arranged adjacent to a second cooling duct of another battery module.

A common inlet may be provided for the first cooling ducts, and a common outlet may be provided for the first cooling ducts. A common inlet and/or common outlet also may be provided for the second cooling ducts. Thus, the multiple inlets and outlets can be connected in uncomplicated fashion to further components of the cooling device, such as a heat exchanger and/or a pump advantage. The forerun and the outlet of a cooling duct may be arranged on opposite sides. It is possible for at least one common feed line and/or one common discharge line to be provided between the inlet and/or the outlet and the associated cooling ducts.

In an advantageous refinement, it is provided that the cooling device comprises at least one cooling plate. In particular, the cooling ducts are received at least in sections in and/or on the cooling plate and may run entirely in the cooling plate. The cooling ducts may be integrated into the cooling plate, and the cooling ducts and the cooling plate may be formed in one piece. The cooling plate may be arranged under the battery modules. For example, the cooling plate is situated in a base region of the traction battery. A cooling plate of said type offers a particularly good cooling action and can, with little outlay in terms of construction, be used for the cooling of traction batteries of different power levels.

The cooling ducts may run between two opposite sides of the cooling plate. The inlets and/or outlets of the cooling ducts may be arranged on the sides, and preferably on the opposite sides, of the cooling plate. In particular, the feed line and/or discharge line of the coolant may run transversely with respect to the cooling ducts. The feed lines and/or discharge lines may however also run substantially parallel to the cooling ducts. In particular, an inlet of the first cooling duct and an outlet of the second cooling duct may be provided on at least one side of the cooling plate. Then, it is preferable that an inlet of the second cooling duct and an outlet of the first cooling duct are arranged on the opposite side of the cooling plate. The sides of the cooling plate may lie along the sills of the carrier vehicle in the installed state.

The vehicle component may comprise at least one protective plate and/or at least one partition plate. The cooling plate may be arranged between the partition plate and the protective plate. In an intended installation position, the protective plate is directed toward the road surface, and the partition plate is arranged between the battery modules and the protective plate. Such an arrangement makes it possible for the vehicle component to be received in a vehicle in a secure and reliable manner, and at the same time permits an advantageous cooling action of the cooling plate. The partition plate and/or the protective plate may be a sheet-metal material and may be manufactured from an aluminum alloy.

The vehicle component may comprise at least one support element. The support element may be configured for being installed on a vehicle body. For example, the traction battery is, by way of the support element, installed in the underfloor region of the vehicle. For this purpose, the support element may be fastened to a floor assembly of the body and/or to the sills. The support element may be configured for receiving the cooling plate and/or the protective plate and/or the partition plate. The support element may also be provided for receiving the traction battery. The battery modules may be fastened to the support elements. Such a support element makes it possible for the traction battery to be accommodated in a space-saving fashion. The support element may be manufactured from an aluminum alloy.

The method according to the invention functions for operating a vehicle component for an at least partially electrically operated vehicle. The method is provided for cooling a traction battery with at least one battery module with at least one battery cell. At least one duct system of at least one cooling device is flowed through by at least one cooling medium. The duct system runs at least in sections along the battery module for the purposes of absorbing heat.

The battery module is assigned at least one first and at least one second cooling duct. The first and second cooling ducts are charged with the coolant substantially in parallel.

The method according to the invention offers improved cooling for a traction battery, because the battery modules can be cooled much more uniformly by virtue of two cooling ducts being charged with coolant in parallel. In particular, the charging of the first and of the second cooling duct with coolant is performed in the manner of a hydraulic parallel connection.

The first and the second cooling duct preferably are charged with the coolant in opposite flow directions. In particular, the coolant of the first cooling duct is conveyed in the opposite direction to the coolant of the second cooling duct. Here, it may be provided that the coolant of the first cooling duct and the coolant of the second cooling duct are at least temporarily merged, for example at a pump device and/or at a heat exchanger.

Further advantages and features of the present invention will emerge from the exemplary embodiments, which will be discussed below with reference to the appended figures.

DETAILED DESCRIPTION

Figure 1:
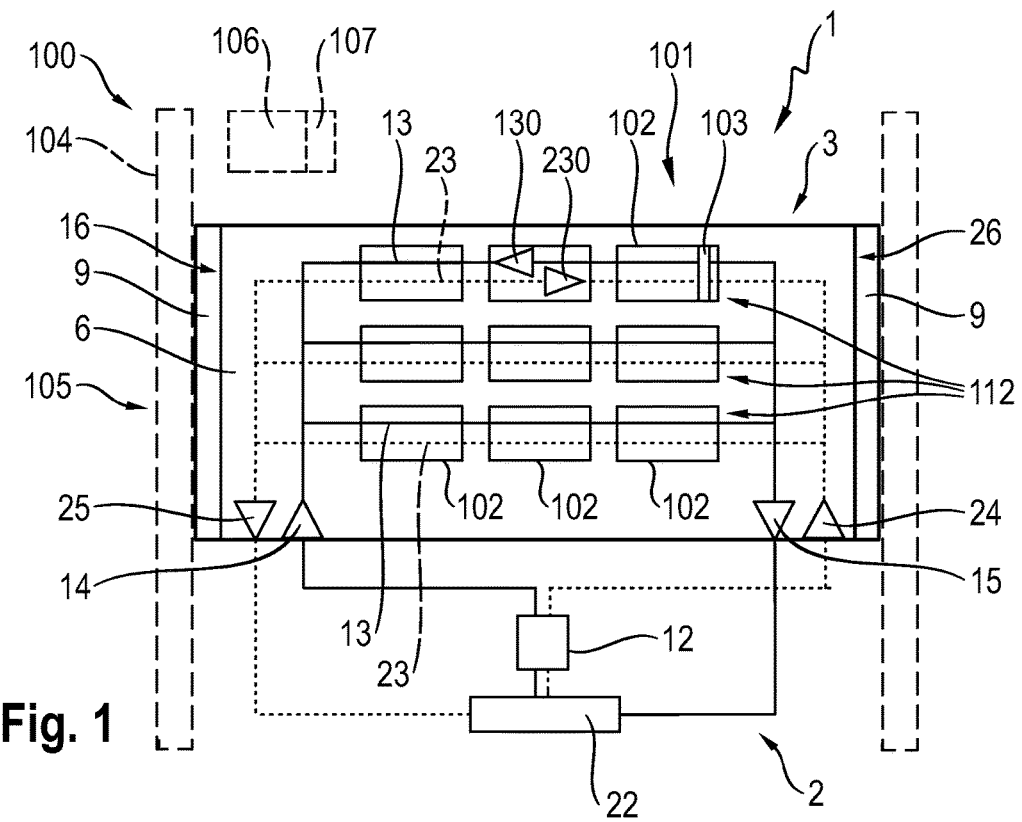
FIG. 1 shows a vehicle component according to the invention in highly schematic form.

FIG. 1 shows a vehicle component 1 according to the invention with a cooling device 2 for cooling a traction battery 101 of an at least partially electrically operated vehicle 100, such as an electric vehicle or a hybrid vehicle. The vehicle 100 is illustrated in highly diagrammatic form. Schematically illustrated parts of the sill region 105 of a vehicle body 104 are shown. The vehicle 100 further has an electric drive 106 with a control device 107 that also is designed for controlling the cooling device 2.

The traction battery 101 supplies energy to the drive 106 and comprises a multiplicity of battery modules 102, each of which has a multiplicity of battery cells 103. For the sake of clarity, only nine battery modules 102 and a single battery cell 103 are illustrated here. The number of cells 103 and battery modules 102 preferably is adapted to the energy demand of the drive 106. In this case, the traction battery 101 comprises a support element 9 in the form of a battery frame and on which the cooling device 2 is arranged together with the battery modules 102. The traction battery 101 preferably is positioned in the underfloor region of the vehicle 100. For this purpose, the support element 9 is formed, on two opposite sides 16, 26, with corresponding connecting elements such that the vehicle component 1 together with traction battery 101 can be fastened reliably along the sill regions 105.

The vehicle component 1 comprises a cooling device 2 with a duct system 3 through which a coolant flows for optimum temperature control of the traction battery 101 during operation and during charging processes. The coolant is a fluid, and preferably a liquid. However, a gaseous coolant may be provided.

The cooling device 2 comprises a pump 12 and a heat exchanger 22. The pump 12 conveys the coolant through the duct system 3. Alternatively, passive conveying of the coolant may be provided by way of convection. The heat exchanger 22 may be a cooler with the largest possible surface through which air flows. A fan may be provided to generate the air flow. The additional or exclusive use of relative wind is also possible. The heat exchanger 22 also may cool the heated coolant by a further liquid coolant flowing past. At least one thermostat and/or at least one controllable valve may be provided for adaptation of the coolant temperature. Furthermore, the coolant circuit may be monitored and regulated by at least one control device 107.

Figure 3:
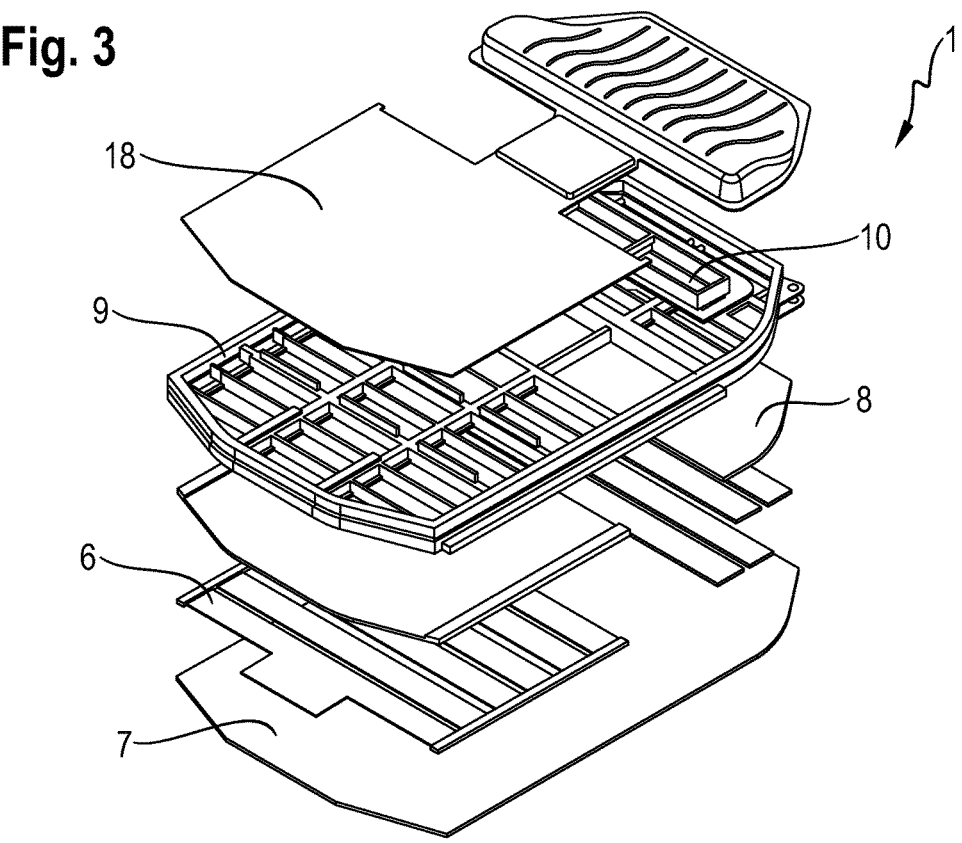
FIG. 3 is a schematic exploded illustration of the vehicle component of FIG. 2.

One part of the duct system 3 is formed as a cooling plate 6 through which ducts extend. The cooling plate 6 is situated under the battery modules 102. FIG. 3 further shows a more detailed illustration of the arrangement of the cooling plate 6 within the traction battery 101. The coolant pump 12 and the heat exchanger 22 are in this case arranged, by way of example, outside the cooling plate 6. The pump 12 or the heat exchanger 22 however also may be provided at least partially at and/or on the cooling plate 6. The cooling plate 6 has two inlets 14, 24 and two outlets 15, 25 for connection to those lines of the duct system 3 that are situated outside the cooling plate 6. A refinement may also be provided in which the cooling ducts 13, 23 of the duct system 3 are led without a cooling plate 6 to the battery modules 102. For example, the cooling ducts 13, 23 may be lines that lead past the battery modules 102 or that lead at least partially through said battery modules.

The cooling device 2 permits particularly uniform temperature control of the battery modules 102. For this purpose, each battery module 102 is assigned a first cooling duct 13 and a second cooling duct 23. The cooling ducts 13, 23 run within the cooling plate 6 that is arranged under the battery modules 102. The cooling ducts 13, 23 lead along the battery modules 102 so that the coolant flowing past can absorb and discharge the heat released from the battery modules 102. Each of the battery modules 102 shown here is cooled by the coolant flowing along in a first cooling duct 13 and second cooling duct 23. The cooling ducts 13, 23 extend between two opposite sides 16, 26 of the cooling plate 6. At their ends, the cooling ducts 13, 23 transition into lines that run along the side regions 16, 26 and that are connected in terms of flow to the respective inlets 14, 24 and outlets 15, 25.

Between the opposite sides 16, 26 of the cooling plate 6, both the first cooling duct 13 and the second cooling duct 23 run along a module group 112, which in this case is composed of three mutually adjacent battery modules 102. A module group 112 also may comprise four, five or more battery modules 102. It may however also be provided that the first and the second cooling duct 13, 23 extend between the two sides 16, 26 of the cooling plate 6 only along one battery module 102.

A total of three module groups 112 are arranged adjacent to one another in this example. The module groups 112 are cooled in each case by dedicated first and second cooling ducts 13, 23. The cooling ducts 13, 23 run parallel to one another. The first cooling duct 13 of an adjacent module group 112 runs parallel to a second cooling duct 23 of the other module group 112, so as to yield an alternating arrangement of first and second cooling ducts 13, 23 in the cooling plate 6. The cooling ducts 13, 23, however, may have any other desired profile between the inlets 14, 24 and the outlets 15, 25. For example, the cooling ducts 13, 23 may have a curved profile and/or a variable spacing to one another. The cooling ducts 13, 23 also may be guided in loops along the battery modules 102.

Coolant that flows along the first duct 13 from one side 16 to the opposite side 26 is warmed up progressively, so that the cooling action gradually decreases with every passage through a battery module 102. A particular advantage of the vehicle component 1 presented here lies in the fact that a decreasing cooling action is counteracted, and reliable uniform cooling for the mutually adjacent battery modules 102 is ensured. For this purpose, the second cooling duct 23 is charged with coolant in parallel with respect to the first cooling duct 13. The second cooling duct 23 that can be charged in parallel enables the battery modules 102 to be fed with a coolant flow that carries coolant at a temperature for optimum cooling. The coolant of the second cooling duct 23 flows from the side 26 to the opposite side 16 of the cooling plate 6. The flow direction 230 of the coolant in the second duct 23 is thus opposite to the flow direction 130 of the coolant in the first cooling duct 13.

A common pump 12 is provided for the cooling ducts 13, 23 that are charged in parallel, and the arrangement of the inlets 14, 24 at opposite sides 16, 26, enables opposing coolant flows for the first and second cooling ducts 13, 23. However, one dedicated pump device 12 and/or one dedicated heat exchanger 22 may be provided for the first and the second cooling duct 13, 23, so as to yield in each case one independent coolant circuit.

Figure 2:
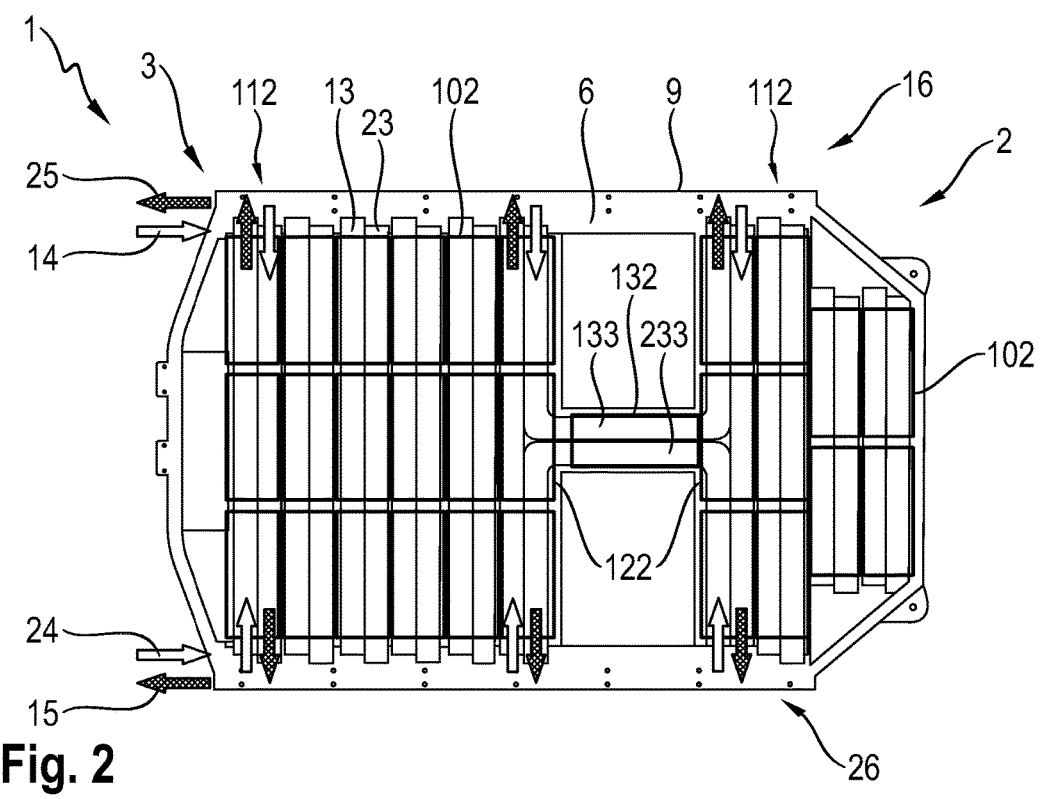
FIG. 2 shows a schematic plan view of a vehicle component.

FIG. 2 shows a vehicle component 1 in an alternate embodiment. The cooling plate 6 of FIG. 2 is provided for the cooling of a traction battery 101 with a multiplicity of battery modules 102. In each case three battery modules are combined to form a module group 112, along which first and second cooling ducts 13, 23 extend. The module groups 112 are arranged adjacent to one another, and the respective cooling ducts 13, 23 run parallel to one another in alternating fashion. The first cooling ducts 13 are connected to one another in terms of flow at the sides 16, 26 of the cooling plate 6. A common inlet 14 of the first cooling ducts 13 is situated on one side 16 and a common outlet 24 of the first cooling ducts 13 is provided on the opposite side 26. An opposite arrangement is provided for the second cooling ducts 23. The second cooling ducts 23 are connected in terms of flow to one another such that a common inlet 24 is formed on the side 26 of the cooling plate 6 and a common outlet 25 is formed on the opposite side 16.

The duct system 3 comprises one first cooling duct 133 and one second cooling duct 233 that run in U-shape. This arrangement permits cooling of a battery module 132 that is arranged offset with respect to the other battery modules 102. Furthermore, the U-shaped arrangement enables two battery modules 122 to be fed in each case by three cooling ducts. Arrangements also are possible in which four, five or more cooling ducts 13, 23 are assigned to one battery module 102. The transversely arranged battery module 132 shown here is arranged, for example, between power electronics or a charging unit or a component of the cooling device 2 or some other component of the vehicle 100. The profile of the cooling ducts 13, 23 is adapted to the arrangement of the battery modules 102 on the cooling plate 6, so that even battery modules 102 that are not arranged adjacent to one another can be reached by the cooling ducts 13, 23. Thus, an optimum utilization of the available structural space is achieved, and, simultaneously, an optimum cooling of all of the battery modules 102 is ensured by the cooling ducts 13, 23 that are charged in parallel.

FIG. 3 is an exploded view of a vehicle component 1. The protective plate 7 is situated at the bottom in the illustration and in the intended installation position is directed toward the road surface. The protective plate is manufactured for example from an aluminum alloy with a thickness of, for example, 3 mm. In the intended installation position, the cooling plate 6 is above the protective plate 7. The cooling plate 6 may also be of multi-part design. It is also possible for two, three or more mutually adjacent cooling plates 6 to be provided, and may be connected to one another in terms of flow. The cooling plate may be manufactured from an aluminum alloy, and may have a wall thickness or a thickness of 1 mm or greater.

A partition plate 8 is provided above the cooling plate 6, and the battery modules 102 are above the partition plate 8. The partition plate is formed, for example, as a partition sheet-metal plate composed of an aluminum alloy with a thickness of, for example, 1.5 mm. A cover 18 is provided above the battery modules 102. The cover 18 has a thickness of, for example, 2 mm and is manufactured for example from an aluminum alloy.

To accommodate the individual components, the vehicle component 1 comprises a support element 9 in the form of a frame. For example, the protective plate 7 and/or the partition plate 8 and/or the cooling plate 6 and/or the cover 18 are fastened to the support element 9. The support element 9 also may have fastening elements for the arrangement of the battery modules 102. By way of example, a receiving element 10 is provided to which components of the traction battery 101 can be fastened. It is also possible for a further row of battery modules 102 to be arranged on the support element 9 to yield, overall, a multi-layered construction of the traction battery 101. It is correspondingly possible for multiple cooling plates 6 to be provided one above the other. The support element 9 also may have installation regions for connection to the vehicle body 104.

Figure 4:
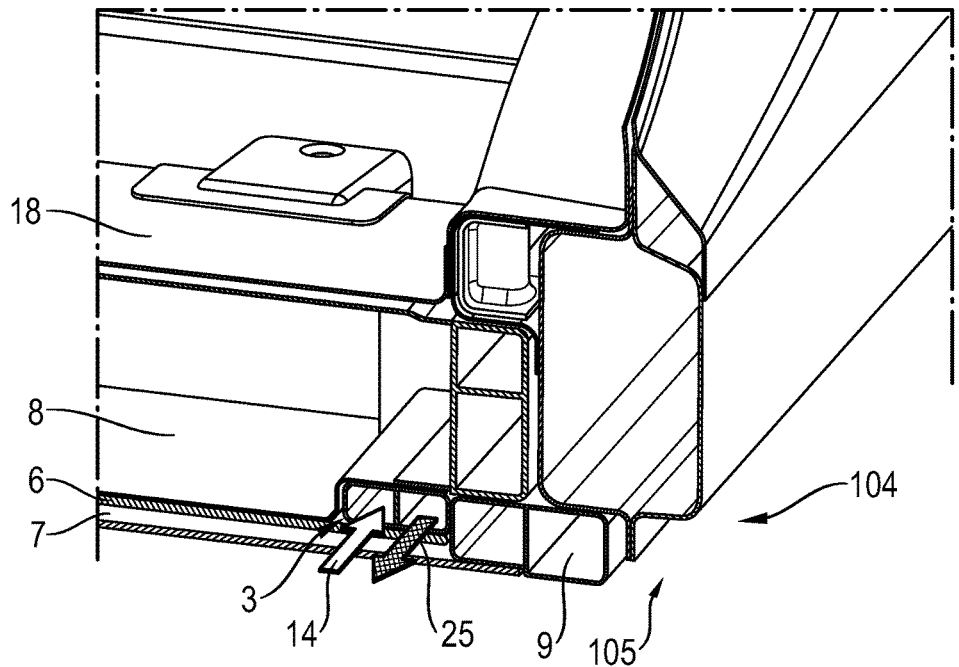
FIG. 4 is an enlarged sectional illustration of the vehicle component of FIGS. 2 and 3.

FIG. 4 shows a sectional, enlarged illustration of the vehicle component 1 of FIG. 3. The cooling plate 6 is situated on the protective plate 7, which is situated at the bottom. The inlets 14, 24 and outlets 15, 25 are arranged above the cooling plate 6 and along a side region of the support element 9. The cooling ducts 13, 23 may be arranged within the cooling plate 6. The cooling ducts 13, 23 may also run above and/or below the cooling plate 6. The battery modules 102 (not shown here) also are situated above the cooling plate 6. The cover 18 is situated above the battery modules.

LIST OF REFERENCE DESIGNATIONS

1 Vehicle component
2 Cooling device
3 Duct system
6 Cooling plate
7 Protective plate
8 Partition plate
9 Support element
10 Receiving element
12 Pump device
13 Cooling duct
14 Inlet
15 Outlet
16 Side
18 Cover
22 Heat exchanger
23 Cooling duct
24 Inlet
25 Outlet
26 Side 100 Vehicle
101 Traction battery
102 Battery module
103 Battery cell
104 Vehicle body
105 Sill region
106 Drive
107 Control device
112 Module group
122 Battery module
130 Flow direction
132 Battery module
133 Cooling duct
230 Flow direction
233 Cooling duct

What is claimed is:

1. A battery unit, comprising:
a cooling plate having opposite first and second sides and a mounting surface;
a traction battery mounted to the mounting surface of cooling plate and having a plurality of battery modules groups, each of the plurality of battery module groups including a plurality of battery modules, and each of the plurality of battery modules including a plurality of battery cells; and
a cooling system for cooling the traction battery, the cooling system comprising:
a first cooling duct extending through the cooling plate, the first cooling duct having a first inlet arranged in proximity to the first side of the cooling plate, and a first outlet, the first cooling duct arranged along a first path to supply coolant to at least one of the plurality of battery module groups in a first direction; and
a second cooling duct extending through the cooling plate, the second cooling duct having a second inlet arranged in proximity to the second side of the cooling plate, and a second outlet, the second cooling duct arranged along a second path spaced from and parallel to the first path to supply coolant to at least one of the plurality of battery module groups in a second direction opposite the first direction.

2. The battery unit of claim 1, further comprising at least one pump for conveying the coolant in the cooling system.

3. The battery unit of claim 1, wherein the first and second cooling ducts cool the plurality of battery module groups.

4. The battery unit of claim 1, wherein the cooling plate is arranged between at least one protective plate and at least one partition plate, the protective plate being between the cooling plate and a road surface, and the partition plate being between the cooling plate and the battery modules.

5. The battery unit of claim 4, further comprising at least one support element configured to be installed on a vehicle body and receives at least one of the cooling plate, the protective plate, the partition plate and the battery module.

* * * * *